United States Patent [19]
Mochida et al.

[11] Patent Number: 5,488,863
[45] Date of Patent: Feb. 6, 1996

[54] ANGULAR VELOCITY SENSOR MAKING USE OF TUNING FORK VIBRATION

[75] Inventors: Yoichi Mochida; Katsuhiko Tanaka; Kazufumi Moriya; Tomoyasu Hasegawa; Kennichi Atsuchi, all of Nagaokakyo, Japan

[73] Assignee: Murata Manufacturing Co., Ltd., Kyoto, Japan

[21] Appl. No.: 227,946

[22] Filed: Apr. 15, 1994

[30] Foreign Application Priority Data

Apr. 16, 1993 [JP] Japan ................... 5-113910

[51] Int. Cl.⁶ ............................. G01P 9/04
[52] U.S. Cl. ............................. 73/504.16
[58] Field of Search .................. 73/505, 517 R, 73/518, 510, 517 AV

[56] References Cited

U.S. PATENT DOCUMENTS

| | | | |
|---|---|---|---|
| 4,538,461 | 9/1985 | Juptner | 73/505 |
| 4,598,585 | 7/1986 | Boxenhorn | 73/505 |
| 4,654,663 | 3/1987 | Alsenz et al. | 73/505 |
| 4,930,351 | 6/1990 | Macy et al. | 73/505 |
| 5,343,749 | 9/1994 | Macy | 73/505 |

FOREIGN PATENT DOCUMENTS

4032559A1  4/1992  Germany .

OTHER PUBLICATIONS

J. Bernstein, et al. "A Micromachined Comb–Drive Tuning Fork Rate Gyroscope", in: *Proceedings IEEE Micro Electro Mechanical Systems*, 1993, pp. 143–148.

*Primary Examiner*—Thomas P. Noland
*Assistant Examiner*—Helen C. Kwok
*Attorney, Agent, or Firm*—Townsend and Townsend and Crew

[57] ABSTRACT

The present invention relates to an angular velocity sensor comprising a tuning fork vibrator which exerts a tuning fork vibration by receiving a driving input and which generates a torque around the axis of a tuning fork owing to Coriolis force by undergoing a rotational action around the center of the tuning fork. The sensor has a detection torsional vibrator which exerts torsional vibration owing to the torque generated by the tuning fork vibrator, whereby the angular velocity sensor detects a rotational angular velocity around the axis of the tuning fork based upon the magnitude of the vibration of the detection torsional vibrator. At least one buffer torsional vibrator is positioned around the detection torsional vibrator for moderating external transmission energy loss of the torsional vibration of the detection torsional vibrator.

13 Claims, 5 Drawing Sheets

ANGULAR VELOCITY SENSOR MAKING USE OF TUNING FORK VIBRATION

BACKGROUND OF THE INVENTION

1. Field of the Invention

The present invention relates to an angular velocity sensor for detecting the angular velocity of a rotator.

2. Description of the Prior Art

Referring to FIGS. 1 and 2, there are illustrated general arrangements of the prior art velocity sensors.

A first prior art example illustrated in FIG. 1 includes driving piezoelectric elements 2a, 2b disposed on outer side surfaces of plate vibrators 1a, 1b of a tuning fork vibrator 1, a detector 3 protruded on the bottom 1c of the tuning fork vibrator 1, and angular velocity detector means (not shown), each comprising a magnet and an electrode, etc., disposed on opposite side surfaces of the detector 3. The bottom 1c is coupled with a fixed plate 1e through a column (tuning fork shaft) 1d.

With such an angular velocity sensor an excitation signal is applied to the driving piezoelectric elements 2a, 2b to cause the plate vibrators 1a, 1b to vibrate with the same magnitude oppositely to each other as indicated by arrows V1, V2 in the figure. In this situation, once the tuning fork vibrator 1 is rotated counterclockwise around an axis Z, oppositely directed inertia forces (Coriolis forces) F1, F2 are generated perpendicularly to the direction of the vibration and perpendicularly to a rotation axis (Z axis). A torque due to the oppositely directed Coriolis forces F1, F2 is applied on the tuning fork vibrator 1 whereby the vibrator 1 exerts torsional vibration, the magnitude of the amplitude of which torsional vibration is detected by detector means (not shown) and is outputted as an angular velocity signal. A change in the amplitude of the torsional vibration of the tuning fork vibrator 1 is detected as a change in electrostatic capacity between a detector electrode provided in the detector means and another electrode disposed oppositely to the former.

The first prior art example described above has, however, has unsatisfactory detection accuracy and is generally too large. In contrast, another prior art example illustrated in FIG. 2 is contemplated to solve the difficulties with the first prior art example and is described in a reference (PROCEEDINGS FOR MICROELECTRO MECHANICAL SYSTEMS Feb. 7–10, 1993). An angular velocity sensor in the same figure is formed using a semiconductor substrate such as a silicon substrate with the aid of a semiconductor microprocessing technique. A fixed electrode 5 is formed at the center on a substrate 25, and vibration plates 7, 8 of a tuning fork vibrator are disposed on the left and right sides of the fixed electrode 5 in a floating state with their corners 7a, 7b, 8a, 8b coupled to a fixed portion 14c, and electrodes (not shown) are disposed on an opposed surface to the substrate 25 and the vibration plates 7, 8 floating from the substrate 25. A plurality of holes 9 are formed in the vibration plates 7, 8, and comb electrodes 10a, 10b, 11a, 11b are provided on the left and right sides of each vibration plate 7, 8, protruding from the same sides. Comb electrodes 5a, 5b are likewise formed on the fixed electrode 5, which are disposed putting slight spaces between them and the comb electrodes 10a, 11a of the vibration plates 7, 8.

In the angular velocity sensor arranged as described above, a vibration driving signal is applied between the comb electrodes 5a, 5b of the fixed electrode 5 and the comb electrodes 10a, 11a of the vibration plates 7, 8 to vibrate the vibration plates 7, 8 oppositely but with the same magnitudes indicated by V1, V2 in the figure. In this situation, once the vibration plates 7, 8 are rotated counterclockwise around an axis Y, there are produced opposite inertia forces (Coriolis forces) F1, F2 perpendicular to the directions of vibrations and to the axis Y. The opposite Coriolis forces F1, F2 cause torsional vibrations of the vibration plates 7, 8, changes in the amplitudes of which torsional vibrations are detected as changes of electrostatic capacities between electrodes disposed in opposition on the substrate 25 and the vibration plates 7, 8. The changes are outputted as a detection signal of an angular velocity.

In accordance with the second prior art example, as described above, it is fabricated with use of a microprocessing technique and hence is miniaturized with very excellent processing accuracy compared with the first prior art example.

When such an angular velocity sensor is contemplated to be formed with a semiconductor, it is possible to fabricate it with a higher Q owing to excellent mechanical characteristics of semiconductors. In the second prior art example, however, there is a possibility of the Q being deteriorated as described above. In the second prior art example, the vibration plates 7, 8 of the tuning fork vibrator are directly coupled with the fixed portion 14c through the corners 7a, 7b, 8a, 8b, so that severe distortion is produced between the corners 7a, 7b, 8a, 8b and the direct coupled portions owing to the torsional vibrations produced on the vibration plates 7, 8. Hence much of the vibration energy serving to cause the torsional vibrations is wastefully consumed as external transmission energy from the fixed portion 14c. Accordingly, the Q concerning the torsional vibration of the tuning fork vibrator is reduced thereby resulting in deteriorated detection resolution.

Further, in the angular velocity sensor illustrated in FIG. 1, which comprises a material such as metal and is fabricated through a mechanical processing, it is difficult to improve the Q, and in addition since the plate vibrators 1a, 1b are coupled with the fixed plate 1e through the bottom 1c and the column 1d, much of vibration energy serving to cause the torsional vibrations on the plate vibrators 1a, 1b is wastefully consumed as external transmission energy toward the fixed plate 1e through the bottom 1c and the column 1d. The Qs of the plate vibrators 1a, 1b are further reduced making it difficult to obtain an angular velocity sensor with a higher angular velocity resolution.

SUMMARY OF THE INVENTION

The present invention has been so made as to solve the difficulties with the prior art, and has for its aim to provide an angular velocity sensor with an excellent angular velocity detection resolution in which the Q of a vibrator undergoing torsional vibration is increased by moderating external transmission energy of the torsional vibration of a detection torsional vibrator.

In order to achieve the above aim, according to a main aspect of the present invention, there is provided an angular velocity sensor comprising a tuning fork vibrator vibrating with a driving input and generating torque around the axis of a turning fork with the aid of Coriolis force by undergoing a rotational action on the axis of the tuning fork, and a detection torsional vibrator exerting torsional vibration following the torque generated by said tuning fork vibrator. The angular velocity sensor detects a rotational angular velocity around the axis of the tuning fork based upon the magnitude of the vibration of said detection torsional vibrator, the angular velocity sensor further comprises a buffer torsional vibrator provided outside said detection torsional vibrator for moderating external transmission energy loss of the torsional vibration of the detection torsional vibrator.

As clarified from the foregoing aspects, the tuning fork vibrator vibrates as a tuning fork with a driving input and once in this state the tuning fork vibrator undergoes a rotational action around the axis of the tuning fork, Coriolis forces are produced perpendicularly to the axis of the tuning fork and to the direction of the tuning fork vibration to generate torque around the axis center of the tuning fork, with which torque the detection torsional vibrator exerts torsional vibration.

The magnitude of the amplitude of the torsional vibration is detected and is outputted as an angular velocity detection signal. The buffer torsional vibrator is provided outside the detection torsional vibrator to moderate external transmission energy loss of the torsional vibration of the detection torsional vibrator with the aid of the torsional vibration of the buffer torsional vibrator. The external transmission energy loss of the torsional vibration is hereby extremely reduced to restrict the deterioration of the Q for higher detection resolution and excellent detection sensitivity as an angular velocity sensor.

Further, with an angular velocity sensor arranged as above on a semiconductor substrate with the aid of a semiconductor microprocessing technique, it is possible to fabricate the angular velocity sensor with a higher Q of mechanical characteristics. In addition, external transmission energy loss of the torsional vibration is moderated by the buffer torsional vibrator so that the Q of the mechanical characteristics is prevented from being lowered for further excellent detection resolution.

The above and many other advantages, features and additional aims of the present invention will become manifest to those skilled in the art upon making reference to the following detailed description and accompanying drawings in which preferred structural embodiments incorporating the principles of the present invention are shown by way of illustrative example.

DETAILED DESCRIPTION OF THE PREFERRED EMBODIMENTS

In what follows, the present invention will be described in detail associated with examples illustrated in the accompanying drawings (FIGS. 3A to 6).

Figure 1:
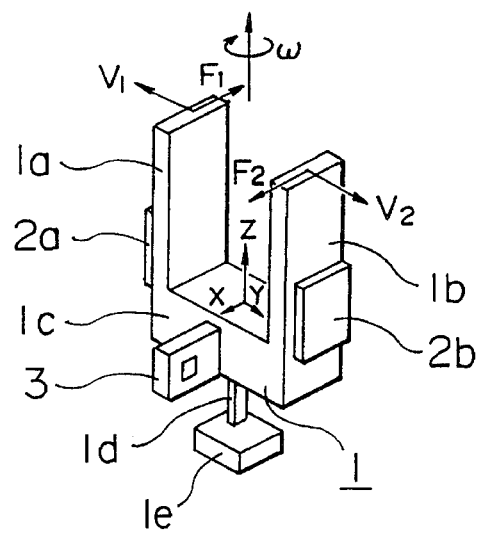
FIG. 1 is a schematic perspective view illustrating a prior art angular velocity sensor including a tuning fork vibrator.
Figure 2:
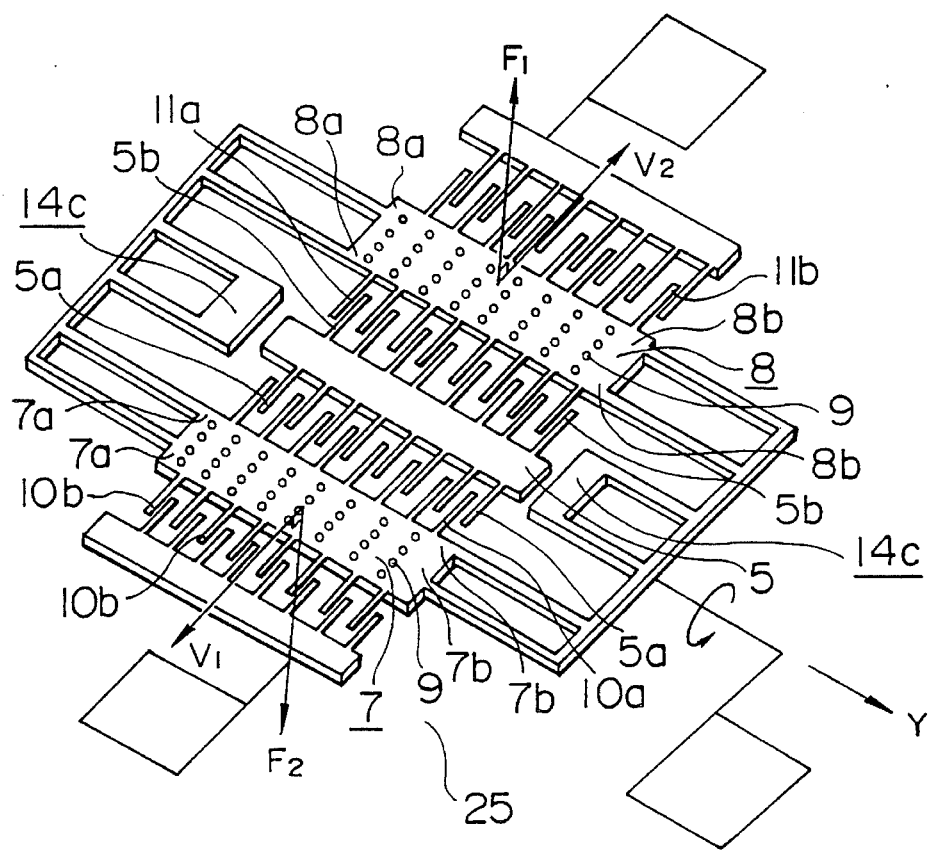
FIG. 2 is a schematic perspective view illustrating a prior art angular velocity sensor fabricated on a semiconductor substrate.
Figure 3A:
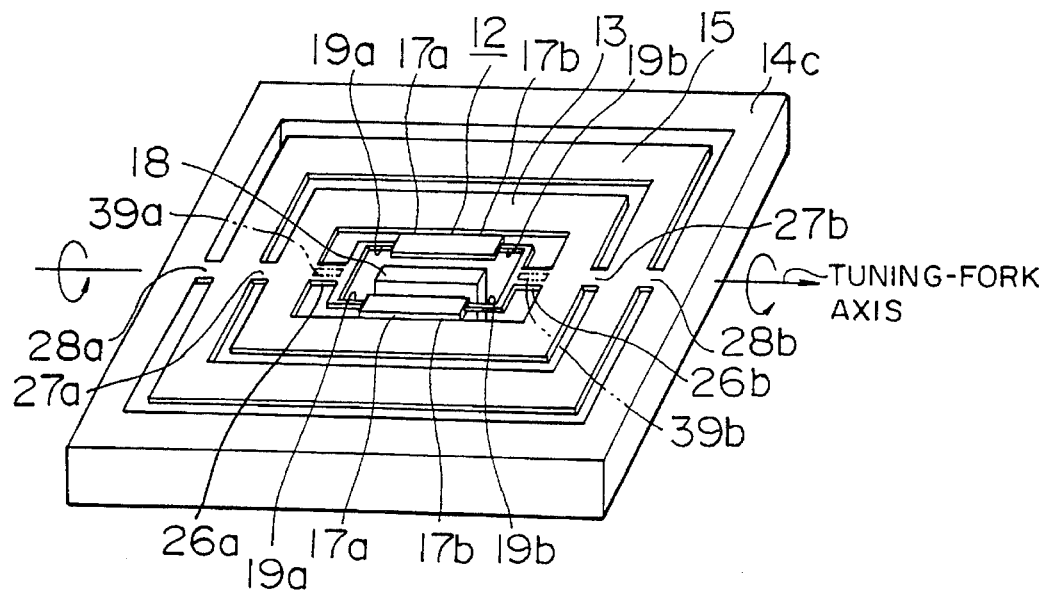
FIG. 3A is a schematic perspective view illustrating a basic arrangement of an angular velocity sensor according to the present invention.
Figure 3B:
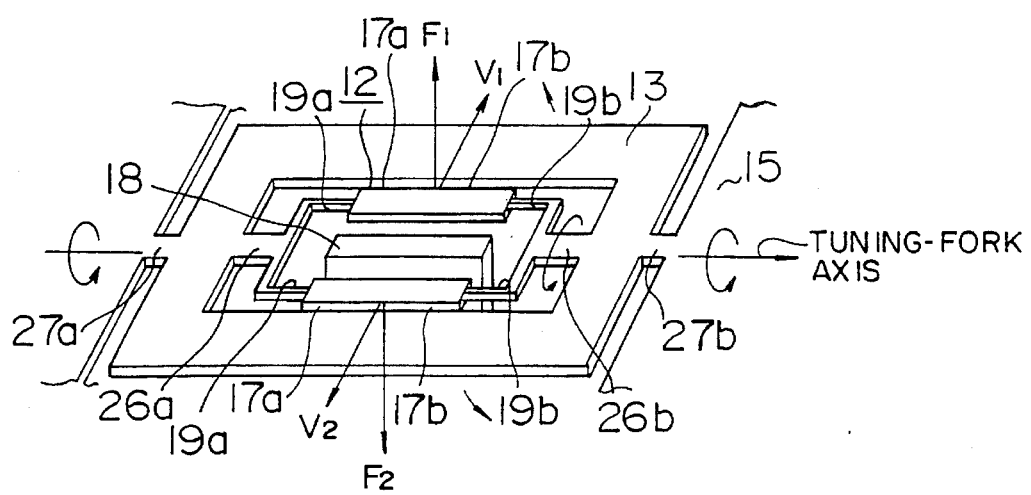
FIG. 3B is an enlarged a perspective view of FIG. 3A.

A basic arrangement of the examples of the present invention will be described with reference to FIGS. 3A and 3B. Referring to FIGS. 3A and 3B, there is illustrated a basic arrangement of an angular velocity sensor according to the present invention. As illustrated in the same figures, a tuning fork vibrator 12 comprises weights 17a, 17b and inverted U-shaped plates 19a, 19b for coupling and supporting the weights 17a, 17b. A fixed driving electrode 18 is disposed at the center of the tuning fork vibration 12, i.e., between the weights 17a and 17b, and electrodes (not shown) are formed on opposite surfaces to the weights 17a, 17b and the fixed driving electrode 18.

To the outside of the turning fork vibrator 12, a frame-shaped detection torsional vibrator 13 is coupled through coupling parts serving as a tuning fork shaft and to the outside of the detection torsional vibrator 13, a frame-shaped buffer torsional vibrator 15 is coupled through coupling parts 27a, 27b for moderating torsional vibration energy of the detection torsional vibrator 13 being lost as external transmission energy. The buffer torsional vibrator 15 is coupled with a fixed frame 14c through coupling parts 28a, 28b.

More specifically, in the case where no buffer torsional vibrator 15 is provided, i.e., the detection torsional vibrator 13 is directly coupled to the fixed frame 14c, torsional vibration of the detection torsional vibrator 13 causes severe distortion between the fixed frame 14c and the detection torsional vibrator 13, i.e., at a root of the coupling part between the fixed frame 14c and the detection torsional vibrator 13 on the side of the fixed frame 14c, and hence much of the torsional vibration energy is wastefully consumed to the side of the fixed frame 14c as external transmission energy. In contrast, in the present basic arrangement, the buffer torsional vibrator 15 is provided between the detection torsional vibrator 13 and the fixed frame 14c to moderate the external transmission energy loss thereof. To be specific a natural vibration frequency of the buffer torsional vibrator 15 is made higher than that of the detection torsional vibrator 13, preferably, the buffer torsional vibrator 15 is interlocked with the movement of the detection torsional vibrator 13 without causing any phase difference therebetween so as to moderate the distortions produced between the detection torsional vibrator 13 and the buffer torsional vibrator 15, i.e., at roots of the coupling parts 27a, 27b, and produced between the buffer torsional vibrator 15 and the fixed frame 14c, i.e., at roots of the coupling parts 28a, 28b, for moderation of the external transmission loss of the torsional vibration. It has already been experimentally verified that a ratio of 1/10 or more between the natural vibration frequency of the detection torsional vibrator 13 and that of the buffer torsional vibrator 15 effectually moderates the external transmission energy loss.

An electrode pattern (not shown) is formed on the surface of the detection torsional vibrator 13, and a fixed detection electrode is formed on an upper fixed side (not shown) opposite to the electrode pattern, to construct the angular velocity sensor.

In the angular velocity sensor arranged as described above, once AC voltage and the like are applied to the fixed driving electrode 18 and the tuning fork vibrator 12 as a driving input, an electrostatic force is produced between the fixed driving electrode 18 and the tuning fork vibrator 12 to cause the weights 17a, 17b of the tuning fork vibrator 12 to vibrate oppositely but with the same magnitude as indicated by arrows V1, V2 in FIG. 3B. In this situation, as the vibrator 12 is rotated around the shaft of the tuning fork, Coriolis forces are produced in the directions F1, F2 indicated in the figure oppositely to each other and perpendicularly to the direction of the vibration of the tuning fork and to the direction of the axis of the tuning fork. These oppositely directed Coriolis forces F1, F2 cause the torsional vibration of the detection torsional vibrator 13. The buffer torsional vibrator 15 is provided between the detection torsional vibrator 13 and the fixed frame 14c and hence the torsional vibration of the detection torsional vibrator 13 is buffered by the buffer torsional vibrator 15 and is transmitted to the fixed frame 1c, so that no greater distortion is produced at the root of the coupling parts 27a, 27b on the side of the buffer torsional vibrator 15 and at the roots of the coupling parts 28a, 28b on the side of the fixed frame 14c. Accordingly, a relatively smaller portion of energy of the torsional vibration is consumed as the external transmission energy to the side of the fixed frame 14c to prevent the Q of the detection torsional vibrator 13 from being lowered.

The amplitude of the torsional vibration (so moderated in the external transmission energy loss by the buffer torsional vibrator 15) is detected as a change in electrostatic capacity between the electrode pattern of the detection torsional vibrator 13 and the fixed detection electrode disposed oppositely to the former, and is outputted as a detection signal of an angular velocity.

In the angular velocity sensor arranged as described above, the buffer torsional vibrator 15 is provided between the detection torsional vibrator 13 and the fixed frame 14c. Hence the external transmission energy loss of the torsional vibration of the detection torsional vibrator 13 is reduced. The Q of the detection torsional vibrator 13 is prevented from being lowered resulting in higher detection resolution and excellent detection sensitivity.

A specific example of the angular velocity sensor having the arrangement as described above will be described with reference to FIGS. 4A and 4B. An angular velocity sensor of the present example is formed with use of a semiconductor substrate such as a silicon substrate through a semiconductor microprocessing technique. The silicon substrate 14 includes a recess 30 in the surface thereof. The fixed driving electrode 18 described in the basic arrangement is formed into the fixed frame 14c by doping boron into the polysilicon. In the recess 30, there are formed a tuning fork vibrator 12 so as to surround the fixed driving electrode 18, a detection torsional vibrator 13 so as to surround the tuning fork vibrator 12, and a buffer torsional vibrator 15 so as to surround the detection torsional vibrator 13, all in a floating state. The tuning fork vibrator 12 is coupled with the detection torsional vibrator 13 through coupling parts 26a, 26b, the detection torsional vibrator 13 with the buffer torsional vibrator 15 through coupling parts 27a, 27b, and the buffer torsional vibrator 15 with the fixed frame 14c through coupling parts 28a, 28b. The tuning fork vibrator 12, detection torsional vibrator 13, and buffer torsional vibrator 15 also comprise polysilicon in which boron is doped, to provide low resistances thereof. The tuning fork vibrator 12 comprises weights 17a, 17b, base portions 29a, 29b, and pairs of leaf springs 21 to 24, each pair for coupling and supporting the weights 17a, 17b to the base portions 29a, 29b. The weights 17a, 17b are disposed oppositely to the fixed driving electrode and the base portions 29a, 29b are coupled with the coupling portions 26a, 26b.

As is well known, the natural vibration frequency of the tuning fork vibrator 12 is determined by spring constants of the leaf springs 21 to 24, that of the detection torsional vibrator 13 by spring constants of the coupling portions 27a, 27b, and that of the buffer torsional vibrator 15 by spring constants of the coupling portions 28a, 28b. For increasing the detection accuracy of the angular velocity sensor, the spring constants of the leaf springs 21 to 24 and the coupling portions 27a, 27b are determined such that the natural vibration frequencies of the tuning fork vibrator 12 and the detection torsional vibrator 13 are substantially coincident with each other. Hereby, the torsional vibration is generated with a greater amplitude. Further, the spring constants of the coupling portions 27a, 27b and 28a, 28b are determined such that the natural vibration frequencies of the detection torsional vibrator 13 and the buffer torsional vibrator 15 have a ratio of 1:10, whereby the external transmission energy loss of the torsional vibration is reduced.

A detection electrode 31 is formed on the detection torsional vibrator 13 and lead patterns of a desired number are formed on desired regions on the detection torsional vibrator 13 including the coupling portions 26a, 26b, 27a, 27b, 28a, 28b, on the buffer torsional vibrator 15, and on the fixed portion 14c, through an insulating layer 32 such as silicon oxide (SiO). These lead patterns are taken out from the tuning fork vibrator 12 and the detection electrode 31 and the like.

A glass substrate 20 is disposed on the entire surface of the upper portions of the fixed driving electrode 18, tuning fork vibrator 12, detection torsional vibrator 13, buffer torsional vibrator 15, and fixed frame 14c. The glass substrate 20 is bonded and fixed to the fixed driving electrode 18 and the fixed frame 14c with the aid of an anode bonding technique. An electrode 33 comprising aluminum and the like is formed at a location on the glass substrate 20 opposite to the detection electrode 31 for detecting as an angular velocity signal electrostatic capacity between the detection electrode 31 of the detection torsional vibrator 13 and the electrode 33 of the glass substrate 20, the electrostatic capacity being changed owing to the torsional vibration when the electrode 33 undergoes the angular velocity. Further, a proper number of electrode lead outlets 25 are formed in the glass substrate 20 at locations opposite to the fixed driving electrode 18 and the detection torsional vibrator 13 and at other necessary locations, through which outlets the fixed driving electrode 18 is connected with a driving circuit (not shown) and others and the detection electrode 31 of the detection torsional vibrator 13 and the electrode 33 of the glass substrate 20 are connected with a signal detection circuit (not shown) and others, including necessary electrical connections to desired locations, for completion of the construction of the angular velocity sensor of the present example.

In the following, a fabrication process of the angular velocity sensor constructed as described above will be described with reference to FIGS. 5A to 5F. The angular velocity sensor is formed as one chip among a plurality of chips fabricated on a single crystal silicon wafer using a semiconductor microprocessing technique.

Figure 4A:
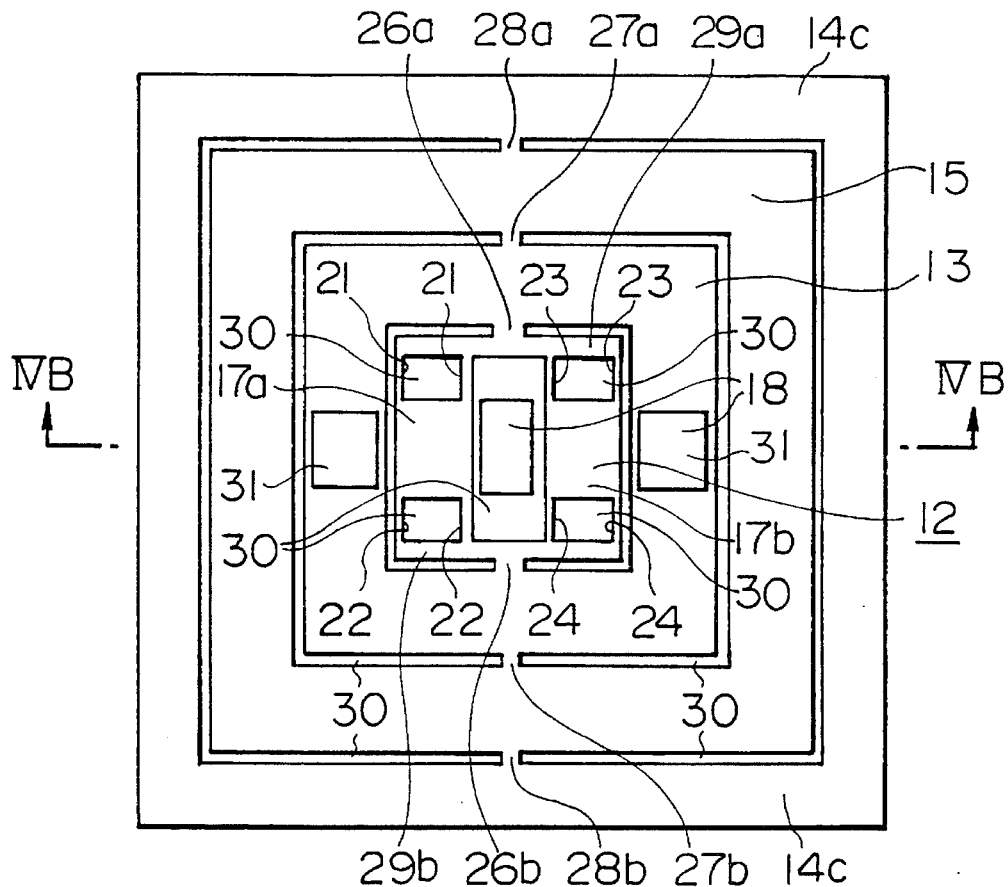
FIG. 4A is a schematic plan view illustrating an example of the angular velocity sensor of the present invention.
Figure 5A:
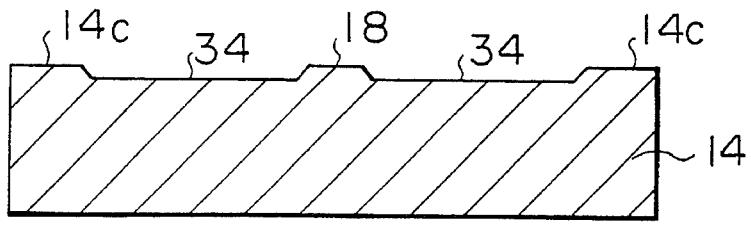
FIGS. 5A to 5F are sectional views each illustrating a process step of fabricating the angular velocity sensor of the present invention, respectively.
Figure 5B:
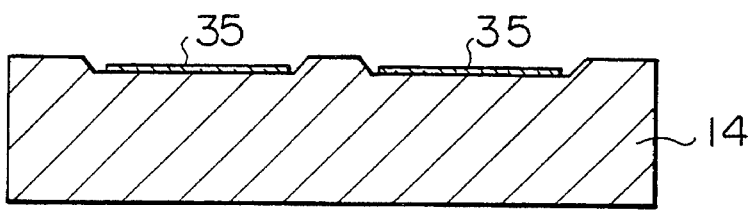
Figure 5C:
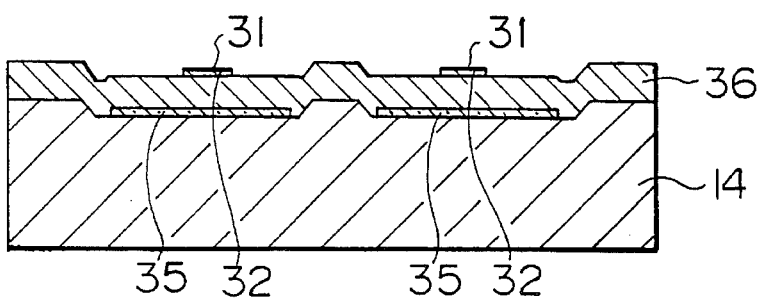

In FIGS. 5A to 5F, there is illustrated an angular velocity sensor formed as one chip in a cross section taken along a line IVB—IVB in FIG. 4A. In FIG. 5A, an about 2 µm recess 34 is formed through etching in the surface of the single crystal silicon substrate 14 at a location corresponding to the recess 30 of FIG. 4A on the same. Then, in FIG. 5B, a PSG (Phospho-Silicate-Glass) film is formed over the entire surface of the substrate 14, and thereafter patterning is performed with use of a regist and the like as a mask so as to leave the PSG film 35 behind only on the recess 34. In FIG. 5C, a polycrystal silicon layer 36 made low resistance by doping of boron and the like is deposited over the entire surface of the substrate 14 with the aid of a CVD (Chemical Vapor Deposition) process and the like. Layer 6 preferably has a thickness of about 5 mm. Thereafter, an insulating layer 32 comprising silicon oxide and the like is formed on lead pattern formation portions of desired regions on the upper portion of the detection torsional vibrator 13, the coupling parts 26a to 28b, etc., and on a detection electrode 31 formation portion. Further, an aluminum thin film as a metal electrode is deposited on the insulating layer 32 formation portion to form the detection electrode 31 and the lead patterns of a desired number.

Figure 5D:
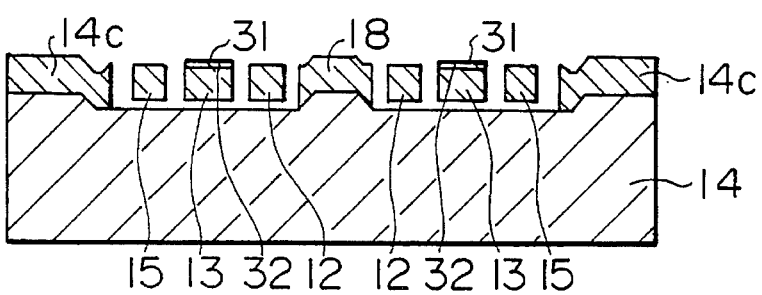

In FIG. 5D, the polycrystal silicon layer 36 is processed into respective forms of the tuning fork vibrator 12, detection torsional vibrator 23, buffer torsional vibrator 15, fixed driving electrode 18, and coupling parts 26a, 26b, 27a, 27b, 28a, 28b with the aid of a dry etching technique such as a RIE (Reactive Ion Etching) using a resist and the like as a mask. It is desirable to lower the temperature of the substrate 14 in the etching process such that the side surfaces of these tuning fork vibrators 12 are perpendicular to the substrate 14. Thereafter, the PSG film 35 is etched and removed using an etching solution, such as fluoric acid, to float the tuning fork vibrator 12, detection torsional vibrator 13, buffer torsional vibrator 15, and coupling parts 26a, 26b, 27a, 27b, 28a and 28b from the substrate 14.

Figure 5E:
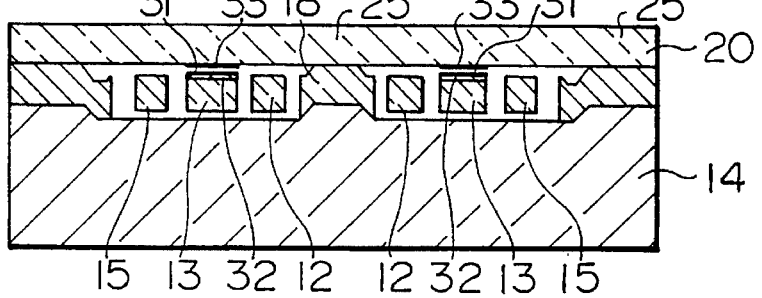

In FIG. 5E, the glass substrate 20 is placed on the whole upper surface of the angular velocity sensor illustrated in FIG. 5d. On the lower surface of the glass substrate 20, the electrode 33 is formed with aluminum and the like at a location opposite to the detection electrode 31 of the detection torsional vibrator 13, and through the glass substrate 20 the electrode lead outlets 25 of a proper number are formed at locations opposite to the fixed driving electrode 18 and the detection torsional vibrator 13 and at other necessary locations.

The glass substrate 20 is bonded and fixed to the fixed frame 14c and the fixed driving electrode 18 with the aid of an anode bonding technique and so on. As a result, an about 1 μm gap is formed between the torsional vibrator 13 and the glass substrate 20.

Figure 5F:
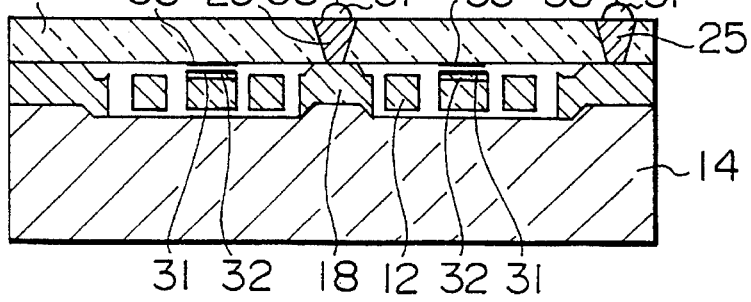

In FIG. 5F, a plurality of angular velocity sensor chips formed as discussed above are cut down one by one, and thereafter lead wires 38 are connected with and fixed to respective desired locations of the fixed driving electrode 18 electrode 33 of the glass substrate 20 and the through a solder 37 utilizing the electrode lead outlet 25 through the glass substrate 20. The chips are further connected to desired circuits such as the driving circuit and a signal detection circuit for completion of the fabrication of the angular velocity sensor.

In the fabrication process, provided in the stages illustrated in FIGS. 5E and 5F, the fabrication is done in a reduced pressure atmosphere, the interior of a fabrication apparatus becomes a reduced pressure atmosphere to ensure the higher Q of the tuning fork vibrator 12 and the detection torsional vibrator 13 for a high resolution angular velocity sensor.

In the foregoing fabrication process of the angular velocity sensor, a single crystal silicon layer may be substituted for the polycrystal silicon layer 36.

Detection operation of an angular velocity by the angular velocity sensor arranged as described above will be described with reference to the perspective view of FIG. 6.

Figure 6:
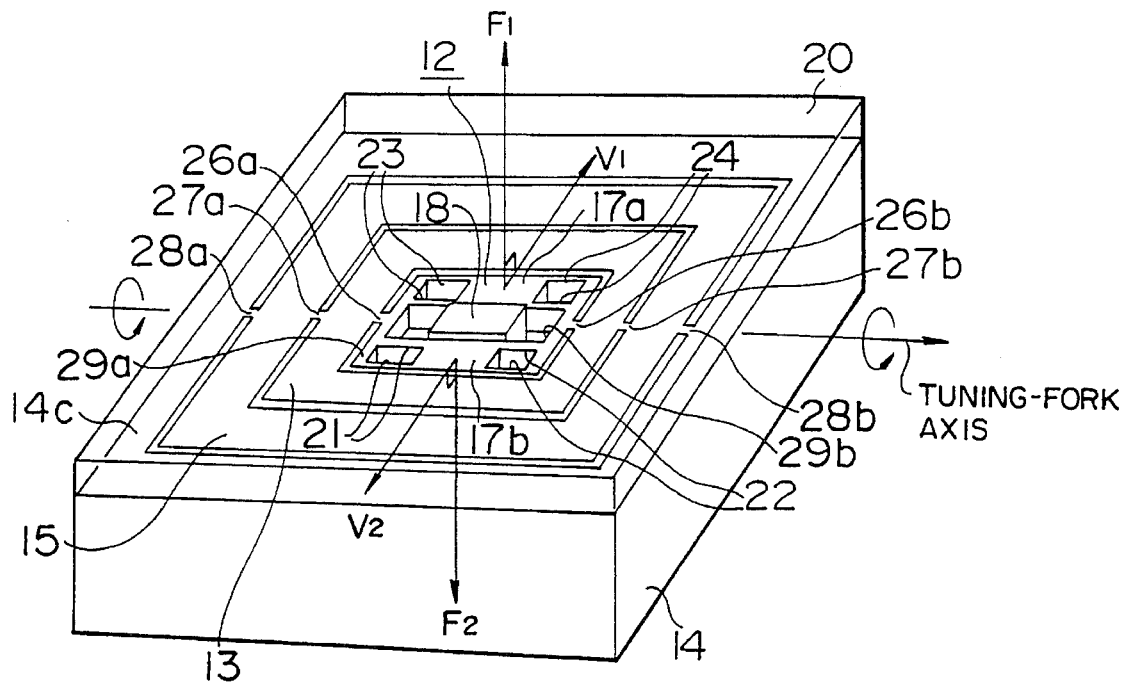
FIG. 6 is a schematic perspective view illustrating the operation of angular velocity detection of the angular velocity sensor of the present invention.

In FIG. 6, once AC voltage is applied to the fixed driving electrode 18 and the tuning fork vibrator 12 as a driving input, an electrostatic force is generated between the tuning fork vibrator 12 and the fixed driving electrode 18 both formed into low resistances, whereby the weights 17a, 17b of the tuning fork vibrator 12 exert opposite tuning fork vibrations in directions indicated by arrows V1, V2 in the figure. Once in this state, the tuning fork vibration 12 undergoes the angular velocity and is rotated around the axis of the tuning fork. Opposite Coriolis forces are produced on the weights 17a, 17b perpendicularly to the axis of the tuning fork and the direction of the vibration of the tuning fork as illustrated in the figure by arrows F1 and F2. A torque around the axis of the tuning fork produced by the Coriolis forces is exerted on the detection torsional vibrator 13 which, in turn, produces the torsional vibration.

Because of the torsional vibration of the detection torsional vibrator 13, the buffer torsional vibrator 15 has a natural vibration frequency ten times that of the detection torsional vibrator 13. The buffer torsional vibration 15 is interlocked with the detection torsional vibrator 13 without causing any phase difference among vibration mode and without causing severe distortion on the side of the fixed frame 14c of the coupling parts 28a, 28b. Vibration energy of the torsional vibration of the detection torsional vibrator 13 is therefore less consumed for the external transmission energy toward the fixed frame 14c. An amplitude change of the torsional vibration of the detection torsional vibration 13 is detected as a change in electrostatic capacity between the detection electrode 31 formed on the detection torsional vibrator 13 and the electrode 33 formed on the glass substrate 20.

In accordance with the present example, in the same manner as in the aforementioned basic arrangement, the buffer torsional vibrator 15 is interposed between the detection torsional vibration 13 and the fixed frame 14c, so that the torsional vibration of the detection torsional vibrator 13 is moderated by the buffer torsional vibrator 15 and is transmitted to the fixed frame 14c. There is accordingly eliminated the production of such severe distortion as in the prior art example on the roots of the coupling parts 28a, 28b on the side of the fixed frame 14c. This results in the reduction of the external transmission energy loss of the torsional vibration of the detection torsional vibrator 13 for prevention of the deterioration of the Q of the detection torsional vibrator 13. Thus, an angular velocity sensor having higher detection resolution and excellent detection sensitivity is ensured.

Further, in the present example, the angular velocity sensor is fabricated with use of a semiconductor silicon substrate and through a semiconductor microprocessing technique such as etching, so that a higher Q of mechanical characteristics is ensured. Accordingly, such provision of the buffer torsional vibrator 15 between the detection torsional vibrator 13 and the fixed frame 14c prevents the Q of the detection torsional vibrator 13 from being lowered because of external transmission energy loss to ensure a further higher Q of the angular velocity sensor for higher detection resolution and excellent detection sensitivity.

It is a matter of course that the present invention is not limited to the foregoing examples and may include varieties of modes of execution thereof. For example, although in the foregoing example the tuning fork vibrator 12, the detection torsional vibrator 13 and the buffer torsional vibrator 15 are formed separately, these members may be formed integrally for a combined use of the tuning fork vibrator 12 and the detection torsional vibrator 13. On the combined use vibrator, there are produced tuning fork vibration due to a driving input and torsional vibration due to Coriolis force.

Although in the foregoing example the tuning fork vibrator 12 is disposed inside the detection torsional vibrator 13, provided the tuning fork vibrator 12 is constructed to serve also as the buffer torsional vibrator 15, the tuning fork vibrator 12 may be disposed on the outside of the detection torsional vibrator 13.

Although in the foregoing example a single buffer torsional vibrator 15 is formed around the detection torsional vibrator 13, a plurality of such buffer torsional vibrators 15 may be formed.

Although the glass substrate 20 is bonded and fixed to the fixed driving electrode 18 and the fixed frame 14c through an anode bonding technique, it may be bonded and fixed to the same members by other techniques such as an eutectic bonding technique.

The detection electrode 31 and the electrode 33 may be formed with other metal conductors.

Further, provided an angular velocity sensor is fabricated such that the natural vibration frequencies of the tuning fork vibrator 12 and the detection torsional vibrator 13 are coincident with each other to permit the respective vibrators to resonate with respect to each other, detection accuracy is advantageously improved because the amplitude of the torsional vibration of the detection torsional vibrator 13 is increased, but such arrangement of an angular velocity sensor is very difficult owing to variations on the fabrication. To solve this, an angular velocity sensor may be constructed such that piezoelectric elements 39a, 39b are disposed on the coupling parts 26a, 26b as vibration adjusting means as indicated by a dotted line in FIG. 3A, to which elements voltage is in turn applied to deflect them for exertion of tensile stress onto the leaf springs 19a, 19b whereby the natural fork vibrator 12 is increased until it reaches that of the detection torsional vibrator 13. It is typical in this case to previously form the natural vibration frequency of the tuning fork vibrator 12 to be lower than that of the detection torsional vibrator 13. With such arrangement, even with existence of variations on fabrication, the natural vibration frequencies of the tuning fork vibrator 12 and the detection torsional vibrator 13 are coincident with each other to sharply improve the Q for improved detection resolution of an angular velocity.

Further, in this case for the vibration adjusting means any other element capable of being controlled in its distortion may be employed instead of the piezoelectric elements 39a, 39b.

Figure 7:
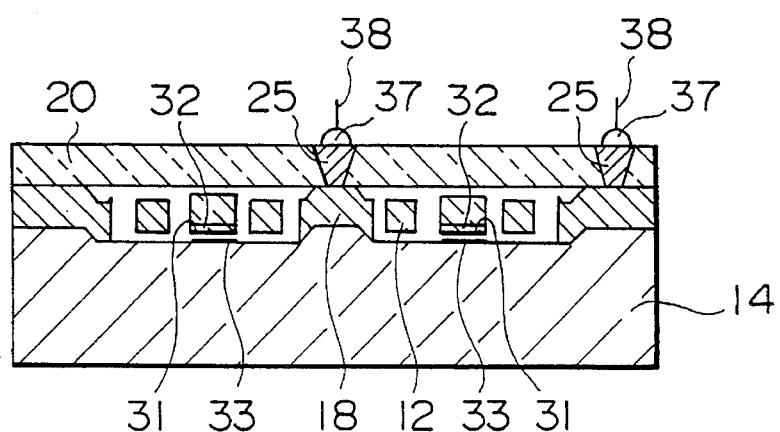
FIG. 7 is a sectional view illustrating another example of the angular velocity sensor of the present invention.

Still further, another example of the angular velocity sensor of the present invention is shown in FIG. 7. In this example, the detection electrode 31 of the detection torsional vibrator 13 is formed through the insulating layer 32 on the bottom surface of the detection torsional vibrator 13, and therefore the electrode 33 oppositely disposed to the detection electrode 31 is formed on the surface of the substrate 14, as shown in FIG. 7.

Figure 4B:
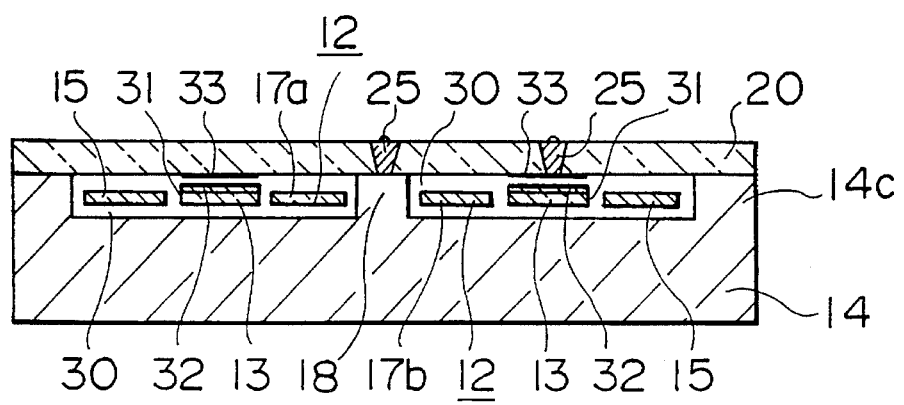
FIG. 4B is a sectional view taken along a line IV B—IV B in FIG. 4A.

Additionally, shapes of the tuning fork vibrator 12, detection torsional vibrator 13, and buffer torsional vibrator 15 are not limited to those of the basic arrangement illustrated in FIGS. 3A and 3B, and to those of the example illustrated in FIGS. 4A and 4B.

What is claimed:

1. An angular velocity sensor comprising:
    a fixed frame having an inner void;
    a tuning fork vibrator positioned within said inner void and having a pair of vibrating elements that oscillate in opposite directions when an electrical input is applied thereto, said vibrating elements being structured and arranged to generate a torque about a tuning axis when said fixed frame is rotated about the tuning axis;
    a detection torsional vibrator positioned within said inner void around said tuning fork vibrator and coupled thereto, said detection torsional vibrator producing a torsional vibration in response to the torque generated by said vibrating elements, said torsional vibration having a magnitude substantially proportional to an angular velocity of said fixed frame about the tuning axis; and
    at least one buffer torsional vibrator circumscribing said detection torsional vibrator and coupling said detection torsional vibrator to said fixed frame for reducing distortion of the torsional vibration of said detection torsional vibrator.

2. The sensor of claim 1 wherein said buffer torsional vibrator has a higher natural vibration frequency than said detection torsional vibrator.

3. The sensor of claim 1 wherein said buffer torsional vibrator is coupled to said detection torsional vibrator such that said buffer torsional vibrator oscillates in the same phase as said detection torsional vibrator.

4. The sensor of claim 1 wherein said tuning fork vibrator, said detection torsional vibrator and said buffer torsional vibrator are made of a polycrystal silicon.

5. The sensor of claim 1 wherein said turning fork vibrator, said detection torsional vibrator and said buffer torsional vibrator are made of a single crystal silicon.

6. The sensor of claim 1, further including a detection electrode formed on said detection torsional vibrator for detecting the torsional vibration of said detection torsional vibrator.

7. The sensor of claim 6 further including a glass substrate mounted over said detection electrode.

8. The sensor of claim 7 wherein said glass substrate has an inner surface with an electrode formed thereon at a location opposite said detection electrode.

9. The sensor of claim 6 further comprising a silicon substrate underlying said detection torsional vibrator and having an electrode formed thereon, said detection electrode being formed on a lower surface of said detection torsional vibrator opposite said electrode.

10. The sensor of claim 1 wherein said tuning fork vibrator includes a first pair of flexures coupling said vibrating elements to said detection torsional vibrator and said detection torsional vibrator includes a second pair of flexures coupling said detection torsional vibrator to said buffer torsional vibrator, said first and second pair of flexures being oriented parallel to the tuning axis so that said detection torsional vibrator may undergo rotation about said tuning axis relative to said fixed frame and said vibrating elements may undergo rotation about said tuning axis relative to said detection torsional vibrator.

11. The sensor of claim 10 wherein said buffer torsional vibrator includes a third pair of flexures coupling said buffer torsional vibrator to said fixed frame, said third pair of flexures being aligned with said first and second pairs of flexures along the tuning axis.

12. An angular velocity sensor comprising:
    a fixed frame oriented in a reference plane and having an inner void, said fixed frame being adapted for rotation about a tuning axis parallel to said reference plane;
    a tuning fork vibrator positioned within said inner void and having a pair of vibrating elements that oscillate in opposite directions perpendicular to said tuning axis and parallel to said reference plane when an electrical input is applied thereto, said vibrating elements being structured and arranged to generate a torque about said tuning axis when said fixed frame is rotated about the tuning axis;

a detection torsional vibrator positioned within said inner void around said tuning fork vibrator, said detection torsional vibrator coupling said tuning fork vibrator to said fixed frame such that said tuning fork vibrator and said detection torsional vibrator can rotate around said tuning axis relative to said fixed frame, said detection torsional vibrator producing a torsional vibration in response to the torque generated by said vibrating elements, said torsional vibration having a magnitude substantially proportional to an angular velocity of said fixed frame about the tuning axis.

13. The sensor of claim 12 further comprising at least one buffer torsional vibrator circumscribing said detection torsional vibrator and coupling said detection fork vibrator to said fixed frame for reducing external transmission energy loss of the torsional vibration of said detection torsional vibrator.

* * * * *